US012774106B2

(12) United States Patent
Gilbert et al.

(10) Patent No.: US 12,774,106 B2
(45) Date of Patent: Oct. 27, 2026

(54) POWER SYSTEM FOR A FLIGHT VEHICLE

(71) Applicant: The Boeing Company, Arlington, VA (US)

(72) Inventors: Eric Benjamin Frederick Gilbert, Seattle, WA (US); Scott Aaron Schorn, Langley, WA (US)

(73) Assignee: The Boeing Company, Arlington, VA (US)

( * ) Notice: Subject to any disclaimer, the term of this patent is extended or adjusted under 35 U.S.C. 154(b) by 133 days.

(21) Appl. No.: 18/444,537

(22) Filed: Feb. 16, 2024

(65) Prior Publication Data

US 2025/0263175 A1 Aug. 21, 2025

(51) Int. Cl.
*B64D 33/08* (2006.01)
*F02C 6/04* (2006.01)

(52) U.S. Cl.
CPC ................ *B64D 33/08* (2013.01); *F02C 6/04* (2013.01); *F05D 2260/213* (2013.01)

(58) Field of Classification Search
CPC ...... B64D 33/08; F02C 6/04; F05D 2260/213
USPC .......................................................... 165/41
See application file for complete search history.

(56) References Cited

U.S. PATENT DOCUMENTS 2,479,776 A * 8/1949 Price ......................... F23R 3/32 60/264
4,248,041 A * 2/1981 Wilde ................. B64C 29/0066 60/229
5,101,622 A * 4/1992 Bond ......................... F02K 9/78 60/768
9,410,451 B2 * 8/2016 Laing ...................... F01K 23/10
9,441,504 B2 * 9/2016 Held ..................... F01K 25/103
(Continued)

FOREIGN PATENT DOCUMENTS

CA 3135770 A1 * 4/2022 ............. B64D 27/04
CN 111379627 A 7/2020
(Continued)

OTHER PUBLICATIONS

European Patent Office, Extended European Search Report issued in a related application EP25151659, Jun. 20, 2025.
(Continued)

*Primary Examiner* — Claire E Rojohn, III
(74) *Attorney, Agent, or Firm* — Kolitch Romano Dascenzo Gates LLP

(57) ABSTRACT

A power system for a flight vehicle includes a first power plant and a second power plant. The second power plant is configured to combust a fuel-fluid mixture. The first power plant includes a closed fluid loop configured to contain a working fluid. The first power plant includes a compressor configured to compress the working fluid. The first power plant includes a thermal engine coupled to the compressor and configured to operate the compressor. In certain configurations, the first power plant includes a container encasing the closed fluid loop, the compressor, and the thermal engine. In various configurations, the power system is coupled to a primary propulsor of the flight vehicle and configured to provide power to the primary propulsor. The power system is separate from the primary propulsor such that the primary propulsor is continuously operable independently of the power system to provide power to operate the flight vehicle.

20 Claims, 8 Drawing Sheets

(56) References Cited

U.S. PATENT DOCUMENTS

| | | | | |
|---|---|---|---|---|
| 9,815,564 | B2 | 11/2017 | Krug et al. | |
| 9,903,232 | B2 * | 2/2018 | Amir | F01K 25/10 |
| 9,970,354 | B2 * | 5/2018 | Klosinski | F01K 23/10 |
| 10,364,744 | B2 | 7/2019 | Vaisman et al. | |
| 11,047,265 | B1 | 6/2021 | Prabhudharwadkar et al. | |
| 11,060,480 | B2 | 7/2021 | Foutch et al. | |
| 11,794,914 | B2 * | 10/2023 | Sidorovich Paradiso | B64D 27/023 |
| 11,867,120 | B2 * | 1/2024 | Zhang | F02C 6/18 |
| 12,241,415 | B1 * | 3/2025 | Keeler | F02C 7/06 |
| 12,281,614 | B1 * | 4/2025 | Minelli | F02C 7/14 |
| 12,630,295 | B2 * | 5/2026 | Bertrand | B64D 27/33 |
| 2010/0146978 | A1 * | 6/2010 | Feher | F02C 9/16 60/730 |
| 2011/0138809 | A1 * | 6/2011 | Ramaswamy | F01K 25/10 60/641.1 |
| 2014/0208943 | A1 * | 7/2014 | Gupta | B64D 37/32 95/146 |
| 2014/0230445 | A1 * | 8/2014 | Huntington | F02C 9/28 165/4 |
| 2014/0345292 | A1 * | 11/2014 | Diaz | F02C 7/047 60/730 |
| 2015/0076831 | A1 * | 3/2015 | Giegel | F01K 9/02 60/671 |
| 2016/0040558 | A1 * | 2/2016 | Bauer | F02C 6/04 60/657 |
| 2016/0061060 | A1 * | 3/2016 | Ekanayake | F02C 7/00 60/39.182 |
| 2016/0122027 | A1 * | 5/2016 | Snyder | F01D 13/00 60/767 |
| 2016/0172954 | A1 * | 6/2016 | Cotroneo | F01D 15/10 310/11 |
| 2016/0208742 | A1 * | 7/2016 | Pande | F02C 3/16 |
| 2017/0167307 | A1 * | 6/2017 | Scipio | F02C 6/18 |
| 2018/0080377 | A1 * | 3/2018 | Austin | F02B 63/044 |
| 2019/0249599 | A1 | 8/2019 | Sen et al. | |
| 2019/0293024 | A1 * | 9/2019 | Carter | F02C 7/224 |
| 2021/0053689 | A1 * | 2/2021 | Lynn | B60L 1/003 |
| 2022/0052361 | A1 * | 2/2022 | Morrison | B60L 50/72 |
| 2022/0153426 | A1 * | 5/2022 | Holley | F02C 1/10 |
| 2022/0363370 | A1 | 11/2022 | Mackin | |
| 2024/0217669 | A1 * | 7/2024 | Mikic | B60L 58/33 |
| 2025/0105315 | A1 * | 3/2025 | Shubenkov | H01M 8/04014 |
| 2025/0116232 | A1 * | 4/2025 | Gore | F02C 7/22 |
| 2025/0146442 | A1 * | 5/2025 | Martina | B64D 27/33 |
| 2025/0172093 | A1 * | 5/2025 | Parmentier | F02C 3/22 |
| 2025/0174688 | A1 * | 5/2025 | Lawes | B60L 1/003 |
| 2025/0198333 | A1 * | 6/2025 | Minelli | F02C 7/14 |
| 2025/0232665 | A1 * | 7/2025 | Natsui | H01P 3/16 |
| 2025/0263175 | A1 * | 8/2025 | Gilbert | B64D 33/08 |
| 2025/0289580 | A1 * | 9/2025 | Gajewski | B64D 33/08 |
| 2025/0361017 | A1 * | 11/2025 | DiRusso | B64D 13/06 |
| 2025/0367592 | A1 * | 12/2025 | Khaled | B01D 53/1475 |
| 2025/0389230 | A1 * | 12/2025 | Coertze | B64D 27/33 |
| 2026/0022664 | A1 * | 1/2026 | Sheinberg | F02C 7/224 |
| 2026/0101487 | A1 * | 4/2026 | Pazinski | B64D 33/08 |
| 2026/0139627 | A1 * | 5/2026 | Lawrence | F02C 7/26 |

FOREIGN PATENT DOCUMENTS

| | | | | |
|---|---|---|---|---|
| EP | 3901445 | A1 | 10/2021 | |
| WO | WO2015145083 | A1 * | 10/2015 | F02B 37/162 |

OTHER PUBLICATIONS

Wikipedia website at https://en.wikipedia.org/wiki/Allison_Model_250; Entitled: Allison Model 250; Retrieved on Feb. 16, 2024; 6 pages.

Nesheiwat, R.; Article entitled: Hydrogen Fuel Cell on a Helicopter: a System Engineering Approach; Arizona State University; May 2016; 63 pages.

Capstone Green Energy website at https://www.capstonegreenenergy.com/products/capstone-microturbines/c200s; Entitled: C200S; Retrieved on Feb. 16, 2024; 3 pages.

* cited by examiner

POWER SYSTEM FOR A FLIGHT VEHICLE

BACKGROUND

Many flight vehicles are powered by one or more turbine engines and may have an auxiliary power unit configured of a small gas turbine and a recuperator. However, the small gas turbine traditionally encounters low compression ratios due to the physics and manufacturability of the small gas turbine. Furthermore, a traditional recuperator is heavy due to the materials used to withstand exhaust gas temperatures of the small gas turbine that are directed through the traditional recuperator. For example, one traditional recuperator is a solid-state recuperator, which is typically made mostly of nickel alloys.

SUMMARY

Traditional recuperators may be heavy due to the types of materials being used to form the recuperator, such as nickel alloys. Therefore, it is desirable to develop a power system that improves a small gas turbine without using a traditional recuperator as discussed above. That is, the power system described herein provides improved power to weight ratio.

The present disclosure provides a power system for a flight vehicle. The power system includes a first power plant and a second power plant. The second power plant is configured to combust a fuel-fluid mixture. The first power plant includes a closed fluid loop configured to contain a working fluid. The first power plant also includes a compressor configured to compress the working fluid. The first power plant further includes a thermal engine coupled to the compressor and configured to operate the compressor.

The present disclosure also provides a flight vehicle that includes a primary propulsor and a power system coupled to the primary propulsor and configured to provide power to the primary propulsor. The power system is separate from the primary propulsor such that the primary propulsor is continuously operable independently of the power system to provide power to operate the flight vehicle. The power system includes a first power plant. The first power plant includes a closed fluid loop configured to contain a working fluid. The first power plant also includes a compressor configured to compress the working fluid. The first power plant further includes a thermal engine coupled to the compressor and configured to operate the compressor.

The present disclosure further provides a first power plant for a power system of a flight vehicle. The flight vehicle includes a primary propulsor. The first power plant includes a closed fluid loop configured to contain a working fluid. The first power plant also includes a compressor configured to compress the working fluid. The first power plant further includes a thermal engine coupled to the compressor and configured to operate the compressor. The first power plant includes a container encasing the closed fluid loop, the compressor, and the thermal engine. The first power plant is continuously operable independently of the primary propulsor to provide power to operate the flight vehicle.

The detailed description and the drawings or figures are supportive and descriptive of the disclosure, but the claim scope of the disclosure is defined solely by the claims. While some of the best modes and other configurations for carrying out the claims have been described in detail, various alternative designs and configurations exist for practicing the disclosure defined in the appended claims.

Figure 1:
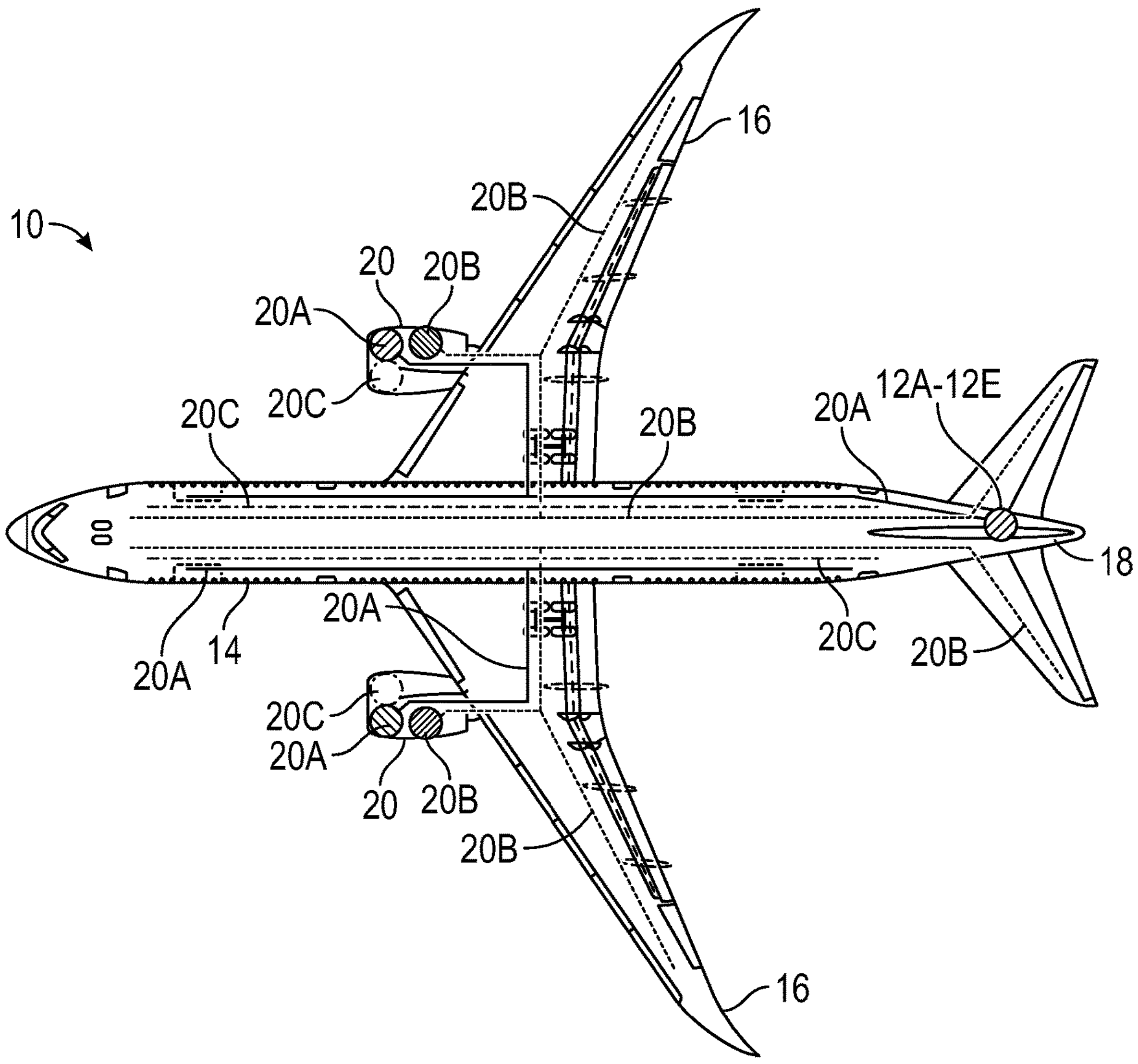
FIG. 1 is a schematic illustration of a flight vehicle and a power system for the flight vehicle.

The present disclosure may be extended to modifications and alternative forms, with representative configurations shown by way of example in the drawings and described in detail below. Inventive aspects of the disclosure are not limited to the disclosed configurations. Rather, the present disclosure is intended to cover modifications, equivalents, combinations, and alternatives falling within the scope of the disclosure as defined by the appended claims.

DETAILED DESCRIPTION

Those having ordinary skill in the art will recognize that all directional references (e.g., above, below, upward, up, downward, down, top, bottom, left, right, vertical, horizontal, etc.) are used descriptively for the FIGS. to aid the reader's understanding, and do not represent limitations (for example, to the position, orientation, or use, etc.) on the scope of the disclosure, as defined by the appended claims. Moreover, terms such as "first," "second," "third," and so on, may be used to describe separate components. Such terminology may include the words specifically mentioned above, derivatives thereof, and words of similar import. Furthermore, the term "substantially" can refer to a slight imprecision or slight variance of a condition, quantity, value, or dimension, etc., some of which are within manufacturing variance or tolerance ranges.

As used herein, an element or step recited in the singular and preceded by the word "a" or "an" should be understood as not necessarily excluding the plural of the elements or steps. Further, any reference to "one configuration" is not intended to be interpreted as excluding the existence of additional configurations that also incorporate the recited features. Moreover, unless explicitly stated to the contrary, configurations "comprising" or "having" an element or a plurality of elements having a particular property may include additional elements not having that property. The phrase "at least one of" as used herein should be construed to include the non-exclusive logical "or", i.e., A and/or B and so on depending on the number of components.

Referring to the figures, wherein like numerals indicate like or corresponding parts throughout the several views, a flight vehicle 10 and a power system 12A-12E for the flight vehicle 10 is generally shown in FIG. 1. Generally, the power system 12A-12E as described herein may be used to provide sufficient power to operate the flight vehicle 10 without the use of a traditional recuperator as discussed above, which provides various benefits, improvements, advantages, etc., some of which are discussed below.

The flight vehicle 10 may be any suitable configuration, and non-limiting examples of the flight vehicle 10 may include an aircraft, a helicopter, a jet, a vertical take-off and landing (VTOL) aircraft, a space shuttle, a drone, a payload, or any other suitable flight vehicle 10. As such, the flight vehicle 10 may be a manned vehicle that is flown by one or more pilots therein, or may be an unmanned flight vehicle 10 that is flown without a pilot therein (e.g., a drone, etc.).

The structure of the flight vehicle 10 as shown in FIG. 1 is one non-limiting example, and it is to be appreciated that the flight vehicle 10 may be configured differently than shown and still utilize the features described herein. In the example of FIG. 1, the flight vehicle 10 may include a fuselage 14 and a plurality of wings 16 extending from opposite sides of fuselage 14. The flight vehicle 10 may include a tail 18 having one or more tail-wings that extend from the fuselage 14 and/or the tail 18.

The flight vehicle 10 may include a primary propulsor 20, and in the example of FIG. 1, one primary propulsor 20 is attached one of the wings 16 and another primary propulsor 20 is attached to another one of the wings 16. The primary propulsor 20 may provide thrust for wing-borne flight, and may include one or more propellers, fans, rotors, etc. Optionally, the primary propulsor 20 may include one or more engines including jet engines, electric machines, electric motors, or any other suitable engine to drive one or more of the propellers, fans, rotors, etc. Various power may be distributed to other locations of the flight vehicle 10 from the primary propulsor(s) 20, and for illustrative purposes, FIG. 1 illustrates an electrical power feed 20A, a hydraulic power feed 20B, and an optional pneumatic power feed 20C.

Referring to FIG. 1, the power system 12A-12E is coupled to the primary propulsor 20, and thus, may be configured to provide power to the primary propulsor 20 or other locations of the flight vehicle 10. In certain configurations, the power system 12A-12E may be housed in the tail 18 of the flight vehicle 10, and is electrically connected to various controllers and/or systems of the flight vehicle 10, such as electrical systems, battery systems, the primary propulsors 20, primary or secondary systems, flight controllers, system controllers, etc., to provide electrical power thereto. Generally, the power system 12A-12E is separate from the primary propulsor 20 such that the primary propulsor 20 is continuously operable independently of the power system 12A-12E to provide power to operate the flight vehicle 10. In other words, the primary propulsor 20 will continue to thrust the flight vehicle 10 through the atmosphere, while the power system 12A-12E provides power, such as electrical power, to other systems of the flight vehicle 10.

Figure 2:
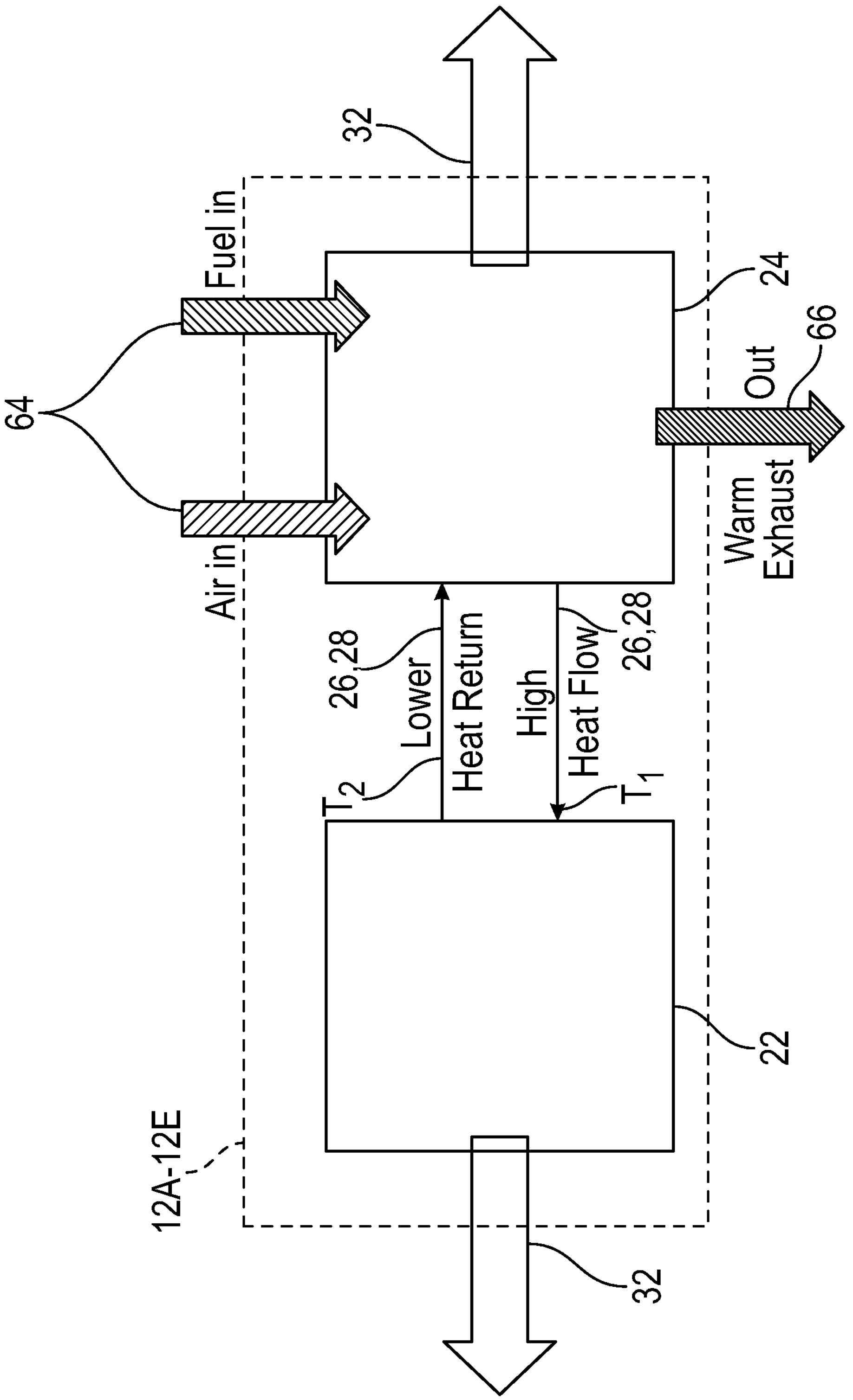
FIG. 2 is a schematic illustration of the power system including a first power plant having a closed fluid loop and a second power plant having an exhaust-fluid path.

Referring to FIG. 2, the power system 12A-12E is generally illustrated without providing the specific features of each of the configurations of FIGS. 3-7. That is, FIG. 2 is a high-level illustration of the power system 12A-12E that is suitable for any of the configurations of FIGS. 3-7. The details of the power system 12A-12E are provided below when each configuration is discussed.

Continuing with FIG. 2, the power system 12A-12E includes a first power plant 22, and may include a second power plant 24 that cooperates with the first power plant 22 to provide an efficient-small engine. Generally, the second power plant 24 may include a turbine engine that creates hot exhaust gases as a by-product of operation of the turbine engine, and the first power plant 22 may use heat created by the exhaust gases of the second power plant 24 to operate as a heat pump. Therefore, the power system 12A-12E may include a power generator being optimized by the first power plant 22 as the heat pump, and the power system 12A-12E may be continuously operable, and thus, thermal management of batteries and/or electronics may be improved by being able to continuously maintain optimum operational temperatures while the power system 12A-12E remains continuously operable. Furthermore, by the first power plant 22 operating as the heat pump, the traditional recuperator as discussed above under the background section may be eliminated. That is, the first power plant 22 is not a solid-state recuperator, which as discussed under the background heading is typically formed mostly of nickel alloys. A weight savings may be obtained by using the first power plant 22 as compared to using the traditional recuperator.

In certain configurations, the first power plant 22 is continuously operable independently of the primary propulsor 20 to provide power to operate the flight vehicle 10. In other words, the primary propulsor 20 will continue to thrust the flight vehicle 10 through the atmosphere, while the first power plant 22 provides power to other systems of the flight vehicle 10 and may provide thermal management of one or more battery packs and/or electronics.

Generally, the first power plant 22 includes a closed fluid loop 26 configured to contain a working fluid 28. In certain configurations, the closed fluid loop 26 is a Brayton cycle, in which heat from the hot exhaust gases (produced via the second power plant 24) are thermally transferred to the closed fluid loop 26 and used in the Brayton cycle to operate as the heat pump. Therefore, the first power plant 22 with the associated fluid loop 26 may be referred to as a closed loop Brayton cycle, while the second power plant 24 and associated path (discussed below) may be referred to as an open loop Brayton cycle.

In certain configurations, the working fluid 28 is in a supercritical state. That is, depending on the type of the working fluid 28 being used, the working fluid 28 may be in the supercritical state. For example, the working fluid 28 may be used in the closed fluid loop 26 due to a magnitude of heat generated via the flight vehicle 10 at the high speed, and the magnitude of heat absorbed by the working fluid 28 maintains the working fluid 28 in the supercritical state. The working fluid 28 attains the supercritical state when a temperature and a pressure of the working fluid 28 is above a critical point (see FIG. 8). Therefore, heat from the second power plant 24 of the flight vehicle 10 is thermally transferred to the working fluid 28 in the fluid loop, which maintains the working fluid 28 at the temperature and the pressure above the critical point. Components to assist in achieving/maintaining the working fluid 28 at the desired temperature and the desired pressure are discussed further below.

Figure 8:
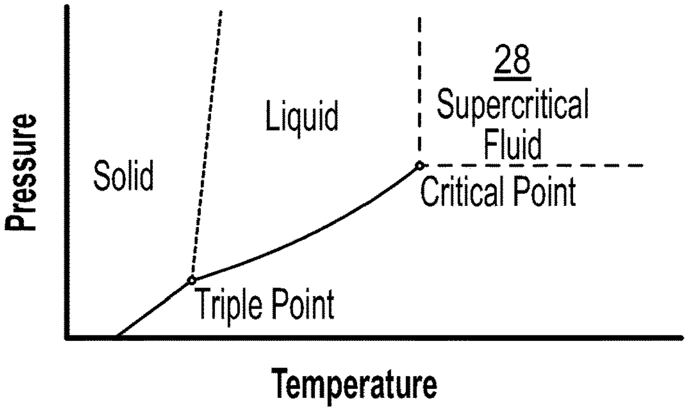
FIG. 8 is a graph of an example supercritical working fluid.

FIG. 8 graphically illustrates the critical point of the working fluid 28, where temperatures and pressures above the critical point will result in the supercritical state. The working fluid 28 may be any suitable substance, some of which achieve the supercritical state and some of which do not achieve the supercritical state. Non-limiting examples of the working fluid 28 may include supercritical carbon dioxide ($SCO_2$), supercritical helium (sHe), molten salt(s), sodium-potassium alloy (NaK), cesium, lithium, etc. Therefore, examples of the working fluid 28 that achieve the supercritical state may include carbon dioxide, helium, methane, inert gas including argon, neon, etc., or any other suitable working fluid that achieves the supercritical state, and examples of the working fluid 28 that do not achieve the supercritical state may include molten salt(s), sodium-potassium alloy (NaK), cesium, lithium, oil including turbine oil, dielectric oil, etc., water, or any other suitable working fluid that does not achieve the supercritical state.

Referring to FIG. 2, the power system 12A-12E may also include the second power plant 24 configured to combust a fuel-fluid mixture. More specifically, the second power plant 24 may include a combustor 30 (see FIGS. 3-7) to combust the fuel-fluid mixture. The fuel-fluid mixture may include any suitable fuels and fluids, and non-limiting examples of the fuel may include petroleum; jet fuel; hydrocarbon fuel including methane, propane, ethane, hexane, etc.; or any other suitable fuel, and non-limiting examples of the fluid may include air, free-oxygen $O_2$, or any other suitable fluid.

As discussed above, in certain configurations, the second power plant 24 may include the turbine engine that combusts the fuel-fluid mixture. Generally, the second power plant 24 utilizes exhaust gases from combusting the fuel-fluid mixture to create power. That is, operation of the second power plant 24 creates a work output 32. Optionally, the work output 32 via the second power plant 24 may be torque that is outputted via a shaft 34A or more than one shaft 34A. The power created by the second power plant 24 may be used to operate various components of the flight vehicle 10, such as a generator, a pump including a hydraulic pump, an oil pump, a fuel pump, etc., a compressor including a pneumatic compressor, a load compressor etc., or any other suitable components of the flight vehicle that may be electrically connected to the power created by the second power plant 24. By using the first power plant 22 in conjunction with the second power plant 24, the second power plant 24 may be a smaller in size gas turbine than the small gas turbine discussed in the background section, with the smaller in size gas turbine providing the same or more work output 32 than the small gas turbine discussed in the background section. Furthermore, by using the first power plant 22 in conjunction with the second power plant 24, the power system 12A-12E may be as thermodynamically efficient as a large gas turbine. For example, the large gas turbine may be equal to or greater than 500 kilowatts (kW), and the small gas turbine may be equal to or less than 200 kW. Therefore, in certain configurations, the power system 12A-12E may operate as a compact turbo generator with significant work output 32 in which the turbine is considered small, but yet operates with sufficient thermodynamic efficiency. It is to be appreciated that the shafts 34A-34D identified in various FIGS. 3-7 are for illustrative purposes, and more or less shafts than illustrated may be used to mechanically connect the various components.

Continuing with FIG. 2, generally, the exhaust gases flow through the second power plant 24 along an exhaust-fluid path 36. The exhaust gases of the exhaust-fluid path 36 is heated due to combusting of the fuel-fluid mixture, and the heat from the exhaust gases is thermally transferred to the working fluid 28 of the closed fluid loop 26 in which the first power plant 22 utilizes to create power. That is, operation of the first power plant 22 creates a work output 32. Optionally, the work output 32 via the first power plant 22 may be torque that is outputted via a shaft 34B or more than one shaft 34B.

Generally, the power system 12A-12E forms two separate paths, one is an exhaust path and another is a working fluid path, but the working fluid path uses the heat produced from the exhaust path, so these paths cooperate with each other. That is, the heat (from the exhaust-fluid path 36) is thermally transferred to the working fluid 28 of the closed fluid loop 26 in which the first power plant 22 utilizes to create power. As such, the working fluid 28 is heated to a first temperature $T_1$ when heat from the exhaust-fluid path 36 is transferred to the closed fluid loop 26, and the working fluid 28 is cooled to a second temperature $T_2$ by the time the working fluid 28 reaches the end of the closed fluid loop 26 where the working fluid 28 is again heated thermally via the exhaust-fluid path 36, and the process is repeated. This concept is generally illustrated via FIG. 2.

Referring to FIGS. 3-7, the first power plant 22 also includes a compressor 38 configured to compress the working fluid 28. Generally, the compressor 38 of the first power plant 22 compresses the working fluid 28 to an increased pressure. Therefore, depending on the type of working fluid 28, the compressor 38 compresses the working fluid 28 to the pressure and the temperature above the critical point, e.g., above a point that the working fluid 28 would condense into liquid form when operating the power system 12A-12E. Generally, the compressor 38 of the first power plant 22 is disposed along the fluid loop.

Continuing with FIGS. 3-7, the first power plant 22 further includes a thermal engine 40 coupled to the compressor 38 and configured to operate the compressor 38. For example, the thermal engine 40 and the compressor 38 may be coupled to each other mechanically or electrically. In one example, the thermal engine 40 includes a shaft 34B or more than one shaft 34B coupled to the compressor 38. As such, the work output 32 from the thermal engine 40 is transferred to the compressor 38 through the shaft 34B, or the work output 32 is transferred to the compressor 38 via an electrical connection. Regardless of the way the work output 32 is coupled to the compressor 38, the work output 32 causes the compressor 38 to operate. Therefore, for example, the thermal engine 40 may produce torque as the work output 32 which is transferred through the shaft 34B to the compressor 38. Using the closed fluid loop 26 allows the compressor 38, the thermal engine 40, and other components along the closed fluid loop 26 to be smaller and lighter as compared to traditional recuperators and/or small gas turbines as discussed above under the background section.

Next, more specific details of each of the configurations of the first power plant 22 and the second power plant 24 are discussed with reference to FIGS. 3-7.

Figure 3:
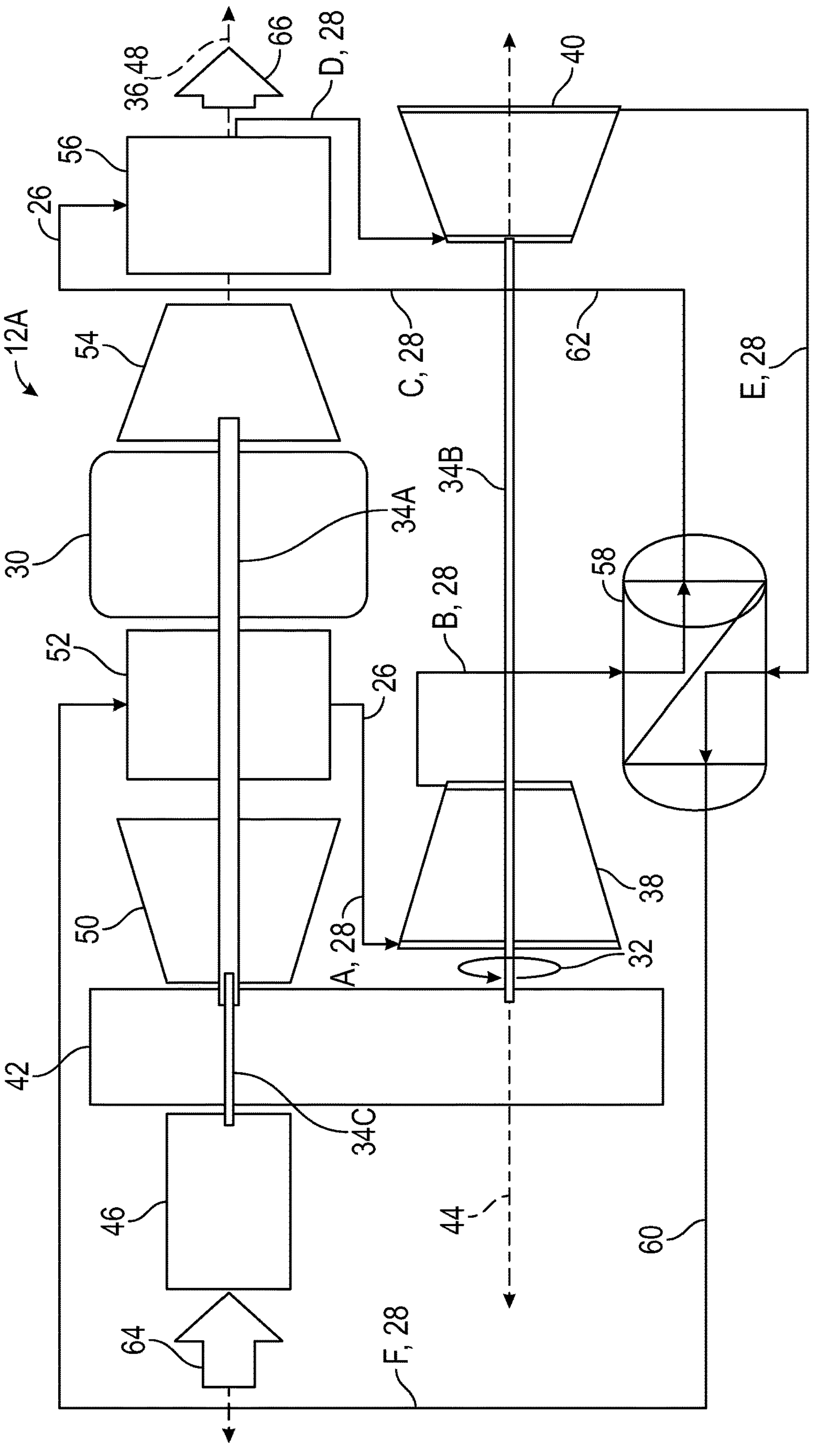
FIG. 3 is a schematic illustration of a first configuration of the first power plant and the second power plant of the power system.

Referring to FIG. 3, in certain configurations, the power system 12A is illustrated, and the compressor 38 may be further defined as a first compressor 38. In this configuration, the first power plant 22 may also include a gearbox 42 connected to the first compressor 38 and the thermal engine 40 along a first mechanical path 44. Also, in this configuration, the first power plant 22 may include a generator 46 connected to the gearbox 42 along a second mechanical path 48 such that work output 32 from the gearbox 42 is used via the generator 46. As shown in FIG. 3, the first mechanical path 44 and the second mechanical path 48 are offset from each other. Also, in this configuration, the exhaust-fluid path 36 and the first mechanical path 44 may be offset from each other. In addition, in this configuration, the exhaust-fluid path 36 and the second mechanical path 48 may align with each other.

Continuing with FIG. 3, in this configuration, the thermal engine 40 may be further defined as a first thermal engine 40. In certain configurations, a shaft 34B or more than one shaft 34B may connect the first compressor 38 and the first thermal engine 40 together along the first mechanical path 44. Furthermore, in certain configurations, a shaft 34C or more than one shaft 34C may connect the gearbox 42 and the generator 46 together along the second mechanical path 48. The first thermal engine 40 may be any suitable configuration to transfer torque and/or extract the work output 32 from the pressurized working fluid 28, and non-limiting examples may include a turbine, a scroll expander, a thermoelectric converter, a thermoionic converter, or any other suitable thermal engine.

Again, continuing with FIG. 3, in this configuration, the second power plant 24 may include a second compressor 50 connected to the gearbox 42 along the exhaust-fluid path 36. For example, a shaft 34C or more than one shaft 34C may connect the second compressor 50 to the gearbox 42. The second compressor 50 is configured to increase the pressure of fluid, such as air, to define compressed or expanded fluid. The fluid is compressed via the second compressor 50 before combustion occurs at the combustor 30.

The first power plant 22 may also include a precooler-heat-exchanger 52 disposed downstream from the second compressor 50 along the exhaust-fluid path 36. Also, the precooler-heat-exchanger 52 is disposed along the closed fluid loop 26, and the heat from expanding the working fluid 28 is transferred to the fluid of the exhaust-fluid path 36 through the precooler-heat-exchanger 52. The precooler-heat-exchanger 52 may be configured to remove excess heat from the working fluid 28. Therefore, for example, the precooler-heat-exchanger 52 may ensure that the temperature of the working fluid 28 does not exceed an operating temperature range of the first compressor 38.

The excess heat from the precooler-heat-exchanger 52 may be expelled or rejected to the surrounding atmosphere or transferred to a secondary fluid, in a heat sink loop, for another system of the flight vehicle 10. As such, the heat sink loop may transfer the excess heat from the precooler-heat-exchanger 52 to a storage structure containing the secondary fluid or to a thermal energy storage device including a battery, etc. The secondary fluid of the heat sink loop may be any suitable fluid, and non-limiting examples may include fuel such as hydrocarbon fuel (e.g., Jet-A, JP-8, JP-10, kerosene, RP2, etc.), cryogenic fuel (e.g., liquid hydrogen, liquid natural gas, etc.), etc., water, or other types of fluid disposed in the flight vehicle 10.

In addition, the second power plant 24 may include a second thermal engine 54 disposed downstream from the precooler-heat-exchanger 52 along the exhaust-fluid path 36, and also disposed downstream from the combustor 30 along the exhaust-fluid path 36. Therefore, combustion at the combustor 30 causes operation of the second thermal engine 54 to produce torque. The second thermal engine 54 may be any suitable configuration to transfer torque and/or extract the work output 32 from the exhaust-fluid path 36. Non-limiting examples of the second thermal engine 54 may include a turbine, a scroll expander, a thermoelectric converter, a thermoionic converter, or any other suitable thermal engine 40.

Also, in this configuration, the first power plant 22 may include a heat intake 56 disposed downstream from the second thermal engine 54 along the exhaust-fluid path 36. The heat intake 56 may be any suitable configuration, and non-limiting examples of the heat intake 56 may include a heat exchanger. Therefore, heat from the exhaust gases exiting the second thermal engine 54 is thermally transferred to the working fluid 28 of the closed fluid loop 26 through the heat intake 56 (heat exchanger).

Optionally, a recuperator 58 may be disposed along the closed fluid loop 26 between the first thermal engine 40 and the precooler-heat-exchanger 52. The recuperator 58 is configured to transfer heat from a low-pressure leg 60 of the closed fluid loop 26 to a high-pressure leg 62 of the closed fluid loop 26. Generally, the recuperator 58 may improve thermal efficiency of the first power plant 22. Therefore, the recuperator 58 may operate as a heat exchanger. Transferring heat to the working fluid 28 via the recuperator 58 prior to further heating the working fluid 28 via the heat intake 56 increases the temperature of the working fluid 28 that enters the first thermal engine 40, which increase an amount of the work output 32 that may be extracted from the working fluid 28.

The working fluid 28 path is a closed loop, and thus referred to as the closed fluid loop 26. As shown in FIG. 3, the precooler-heat-exchanger 52, the first compressor 38, the heat intake 56, and the first thermal engine 40 are arranged along the closed fluid loop 26. Therefore, the flow (as identified as A, B, C, D, E, and F) of the working fluid 28 through the closed fluid loop 26, in sequence starting at the precooler-heat-exchanger 52, is: to the first compressor 38, then to the recuperator 58 if utilizing the recuperator 58, then to the heat intake 56, then to the first thermal engine 40, then back to the recuperator 58 if utilizing the recuperator 58, then back to the precooler-heat-exchanger 52 where the closed loop starts again. If the recuperator 58 is eliminated, the flow (as identified as A, B, D, and E) of the working fluid 28 through the closed fluid loop 26, in sequence starting at the precooler-heat-exchanger 52, is: to the first compressor 38, then to the heat intake 56, then to the first thermal engine 40, then back to the precooler-heat-exchanger 52 where the closed loop starts again.

Now turning to the exhaust-fluid path 36, the components, in sequence, starting at the inlet 64 are: the generator 46, then part of the gearbox 42, then the second compressor 50, then the precooler-heat-exchanger 52, then the combustor 30, then the second thermal engine 54, then the heat intake 56, and finally through an outlet 66 to expel the exhaust gases outside of the second power plant 24, which may be to the outside of the flight vehicle 10.

Figure 4:
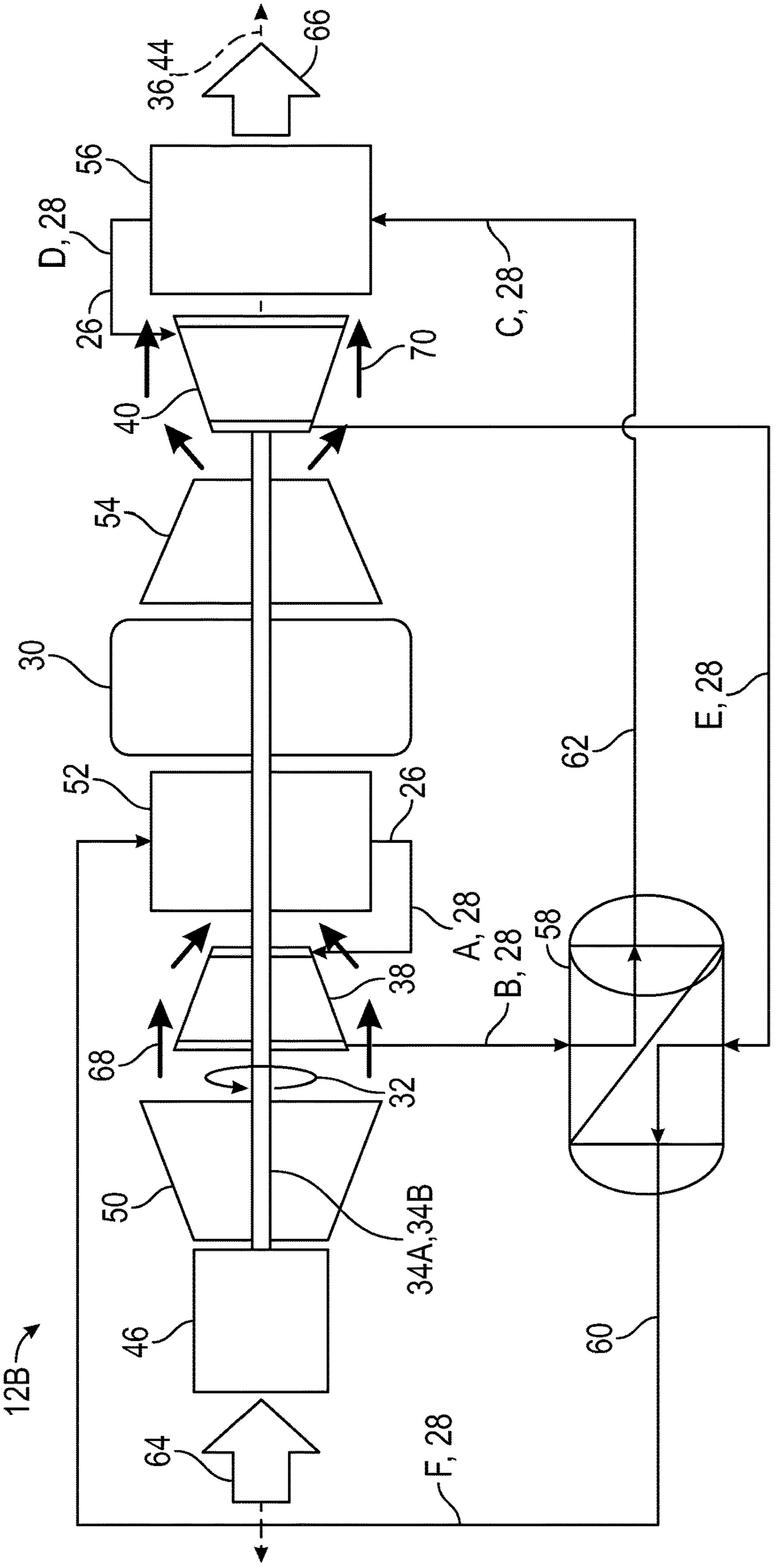
FIG. 4 is a schematic illustration of a second configuration of the first power plant and the second power plant of the power system.

Turning to FIG. 4, the power system 12B is illustrated, and in this configuration, the gearbox 42 of FIG. 3 is eliminated, and now, a single mechanical path 44 is disposed along or aligns with the exhaust-fluid path 36 instead of two separate mechanical paths 44, 48. In this configuration, the components arranged on the exhaust-fluid path 36 are the same components as the components of FIG. 3, but the components arranged on the first mechanical path 44 of FIG. 3 are now arranged along the first mechanical path 44 of FIG. 4. That is, in the arrangement of FIG. 4, the components arranged on the mechanical path 44 are arranged along the components of the exhaust-fluid path 36.

The compressor 38 may be further defined as the first compressor 38, and the thermal engine 40 may be further defined as the first thermal engine 40. Generally, in this configuration, the first compressor 38 may be connected to the first thermal engine 40 along the first mechanical path 44. Therefore, a shaft 34B or more than one shaft 34B may connect the first compressor 38 and the first thermal engine 40 together along the first mechanical path 44. Furthermore, the first power plant 22 may include the generator 46 connected to the first thermal engine 40 along the first mechanical path 44 such that work output 32 from the first thermal engine 40 is used via the generator 46. Since the first compressor 38, the first thermal engine 40, and the generator 46 are each connected together along the same mechanical path, the shaft 34B may also connect the generator 46 to the first compressor 38 and/or the first thermal engine 40. As such, in this configuration, the first thermal engine 40 and the generator 46 are coaxial to each other, and the first thermal engine 40 and the first compressor 38 are coaxial to each other. In other words, the shaft(s) 34B that connect the first thermal engine 40, the generator 46, and the first compressor 38 together are coaxial to each other along the first mechanical path 44.

Continuing with FIG. 4, the second power plant 24 may include the second compressor 50 and the second thermal engine 54 coupled to each other along the exhaust-fluid path 36. Therefore, a shaft 34A or more than one shaft 34A may connect the second compressor 50 and the second thermal engine 54 together along the exhaust-fluid path 36. Due to the first compressor 38 and the first thermal engine 40 being disposed coaxial with the second compressor 50 and the second thermal engine 54, the exhaust-fluid path 36 includes a first outer path 68 in which the compressed fluid flows around the first compressor 38 and includes a second outer path 70 in which the exhaust gases flow around the first thermal engine 40. The shaft 34A, 34B illustrated in FIG. 4 is schematic, and therefore, generally the shaft 34A, 34B represents any number of shafts 34A, 34B that would be mechanically connected to the appropriate components there along.

The first power plant 22 may also include the precooler-heat-exchanger 52 disposed downstream from the first compressor 38 and the second compressor 50 along the exhaust-fluid path 36. In this configuration, the first thermal engine 40 and the second thermal engine 54 are disposed downstream from the precooler-heat-exchanger 52 along the exhaust-fluid path 36. Also, the precooler-heat-exchanger 52 is disposed along the closed fluid loop 26, and the heat from expanding the fluid (for combustion) is transferred to the working fluid 28 through the precooler-heat-exchanger 52. The precooler-heat-exchanger 52 may be configured to remove excess heat from the working fluid 28. Therefore, for example, the precooler-heat-exchanger 52 may ensure that the temperature of the working fluid 28 does not exceed an operating temperature range of the first compressor 38.

Also, in this configuration, the first power plant 22 may include the heat intake 56 disposed downstream from the first thermal engine 40 and the second thermal engine 54 along the exhaust-fluid path 36. The heat intake 56 may be any suitable configuration, and non-limiting examples of the heat intake 56 may include a heat exchanger. Therefore, heat from the exhaust gases exiting the second thermal engine 54 is thermally transferred to the working fluid 28 of the closed fluid loop 26 through the heat intake 56 (heat exchanger).

Continuing with FIG. 4, optionally, the recuperator 58 may be disposed along the closed fluid loop 26 between the first thermal engine 40 and the precooler-heat-exchanger 52. The recuperator 58 is configured to transfer heat from the low-pressure leg 60 of the closed fluid loop 26 to the high-pressure leg 62 of the closed fluid loop 26. Generally, the recuperator 58 may improve thermal efficiency of the first power plant 22. Therefore, the recuperator 58 may operate as a heat exchanger. Transferring heat to the working fluid 28 via the recuperator 58 prior to further heating the working fluid 28 via the heat intake 56 increases the temperature of the working fluid 28 that enters the first thermal engine 40, which increase an amount of the work output 32 that may be extracted from the working fluid 28.

The working fluid 28 path is a closed loop, and thus referred to as the closed fluid loop 26. Therefore, as shown in FIG. 4, the precooler-heat-exchanger 52, the first compressor 38, the heat intake 56, and the first thermal engine 40 are arranged along the closed fluid loop 26. The flow (as identified as A, B, C, D, E, and F) of the working fluid 28 through the closed fluid loop 26, in sequence starting at the precooler-heat-exchanger 52, is: to the first compressor 38, then to the recuperator 58 if utilizing the recuperator 58, then to the heat intake 56, then to the first thermal engine 40, then back to the recuperator 58 if utilizing the recuperator 58, then back to the precooler-heat-exchanger 52 where the closed loop starts again. If the recuperator 58 is eliminated, the flow (as identified as A, B, D, and E) of the working fluid 28 through the closed fluid loop 26, in sequence starting at the precooler-heat-exchanger 52, is: to the first compressor 38, then to the heat intake 56, then to the first thermal engine 40, then back to the precooler-heat-exchanger 52 where the closed loop starts again.

Now turning to the exhaust-fluid path 36, the components, in sequence, starting at the inlet 64 are: the generator 46, then the second compressor 50, then the precooler-heat-exchanger 52, then the combustor 30, then the second thermal engine 54, then the heat intake 56, and finally through the outlet 66 to expel the exhaust gases outside of the second power plant 24, which may be to the outside of the flight vehicle 10.

Figure 6:
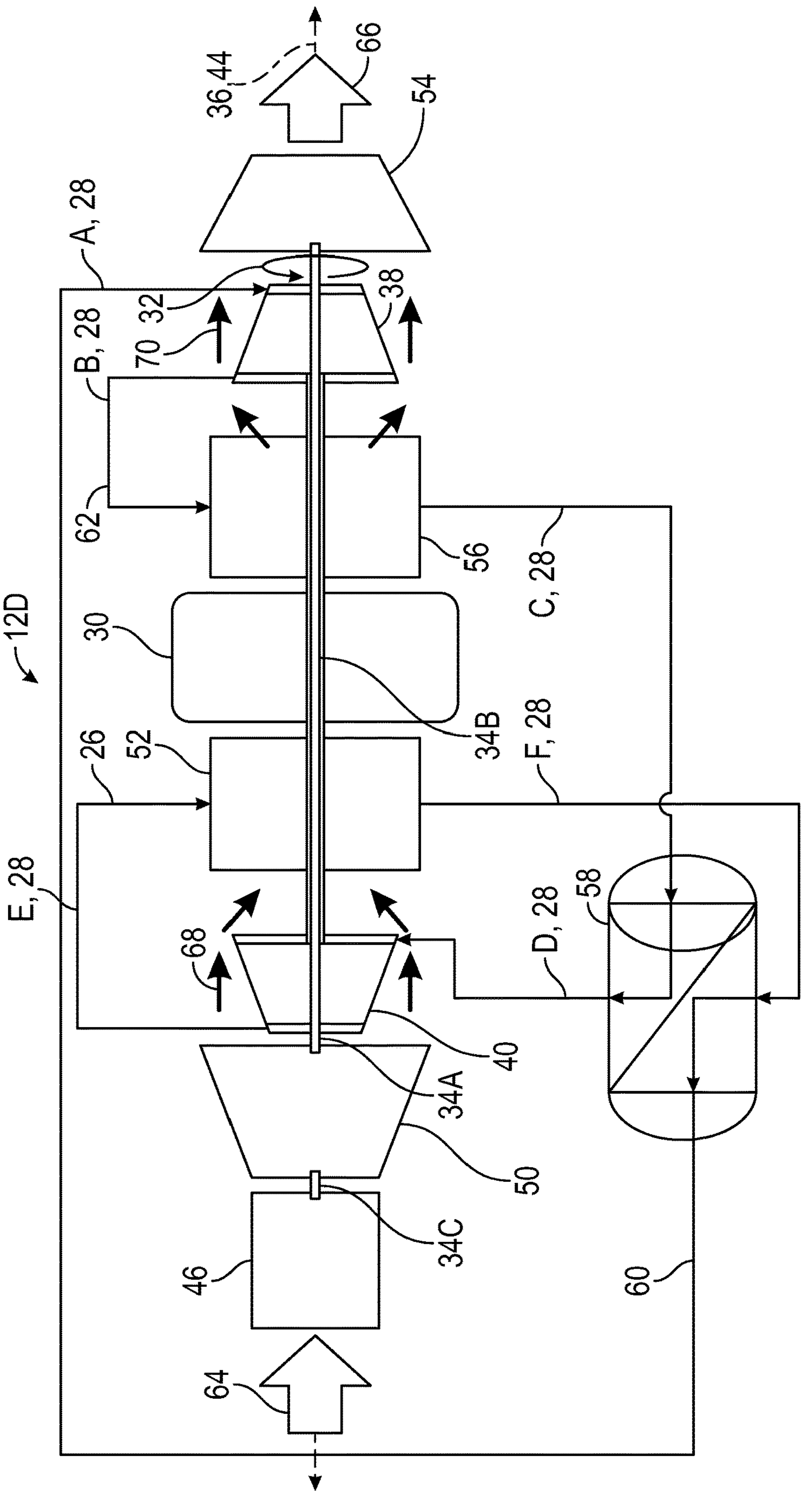
FIG. 6 is a schematic illustration of a fourth configuration of the first power plant and the second power plant of the power system.

Referring to FIG. 6, the power system 12D is illustrated, and in this configuration, the gearbox 42 is again eliminated, and this configuration is a rearrangement of some of the components of FIG. 4. Generally, the first compressor 38, the first thermal engine 40, the heat intake 56, and the second thermal engine 54 are rearranged in FIG. 6 as compared to the arrangement of FIG. 4. The configuration of FIG. 4 and the configuration of FIG. 6 may have the same components, just in a different arrangement, and therefore, see the above discussion for additional details of the components. The below discussion for FIG. 6 focuses on the different arrangement.

In the configuration of FIG. 6, the second power plant 24 may include the second compressor 50 and the second thermal engine 54 coupled to each other along the exhaust-fluid path 36. Therefore, a shaft 34A or more than one shaft 34A may connect the second compressor 50 and the second thermal engine 54 together along the exhaust-fluid path 36. Continuing with the configuration of FIG. 6, the precooler-heat-exchanger 52 of the first power plant 22 is disposed downstream from the first thermal engine 40 along the exhaust-fluid path 36. The second compressor 50 is disposed upstream from the precooler-heat-exchanger 52 and the first thermal engine 40 along the exhaust-fluid path 36. Also, in this configuration, the heat intake 56 of the first power plant 22 is disposed upstream from the first compressor 38 and the second thermal engine 54 along the exhaust-fluid path 36.

The working fluid 28 path is a closed loop, and thus referred to as the closed fluid loop 26. Therefore, as shown in FIG. 6, the precooler-heat-exchanger 52, the first compressor 38, the heat intake 56, and the first thermal engine 40 are arranged along the closed fluid loop 26. The flow (as identified as A, B, C, D, E, and F) of the working fluid 28 through the closed fluid loop 26, in sequence starting at the optional recuperator 58, is: to the first compressor 38, then to the heat intake 56, then the recuperator 58 if utilizing the recuperator 58, then to the first thermal engine 40, then to the precooler-heat-exchanger 52, then back to the recuperator 58 if utilizing the recuperator 58, then back to the first compressor 38 where the closed loop starts again. If the recuperator 58 is eliminated, the flow (as identified as A, B, C, and E) of the working fluid 28 through the closed fluid loop 26, in sequence starting at the precooler-heat-exchanger 52, is: to the first compressor 38, then to the heat intake 56, then to the first thermal engine 40, then back to the precooler-heat-exchanger 52 where the closed loop starts again. With this configuration, optionally, the work output 32 via the second power plant 24 may be torque that is outputted via the shaft 34A, and the work output 32 via the second power plant 24 may be used to power other systems, mechanical components, etc., of the flight vehicle 10. Additional shafts 34B, 34C may be used for the configuration of FIG. 6, and one or more other shafts, not illustrated, may be used in the configuration of FIG. 6.

Now turning to the exhaust-fluid path 36 of FIG. 6, the components, in sequence, starting at the inlet 64 are: the generator 46, then the second compressor 50, then the precooler-heat-exchanger 52, then the combustor 30, then the heat intake 56, then the second thermal engine 54, and finally through the outlet 66 to expel the exhaust gases outside of the second power plant 24, which may be to the outside of the flight vehicle 10.

Figure 5:
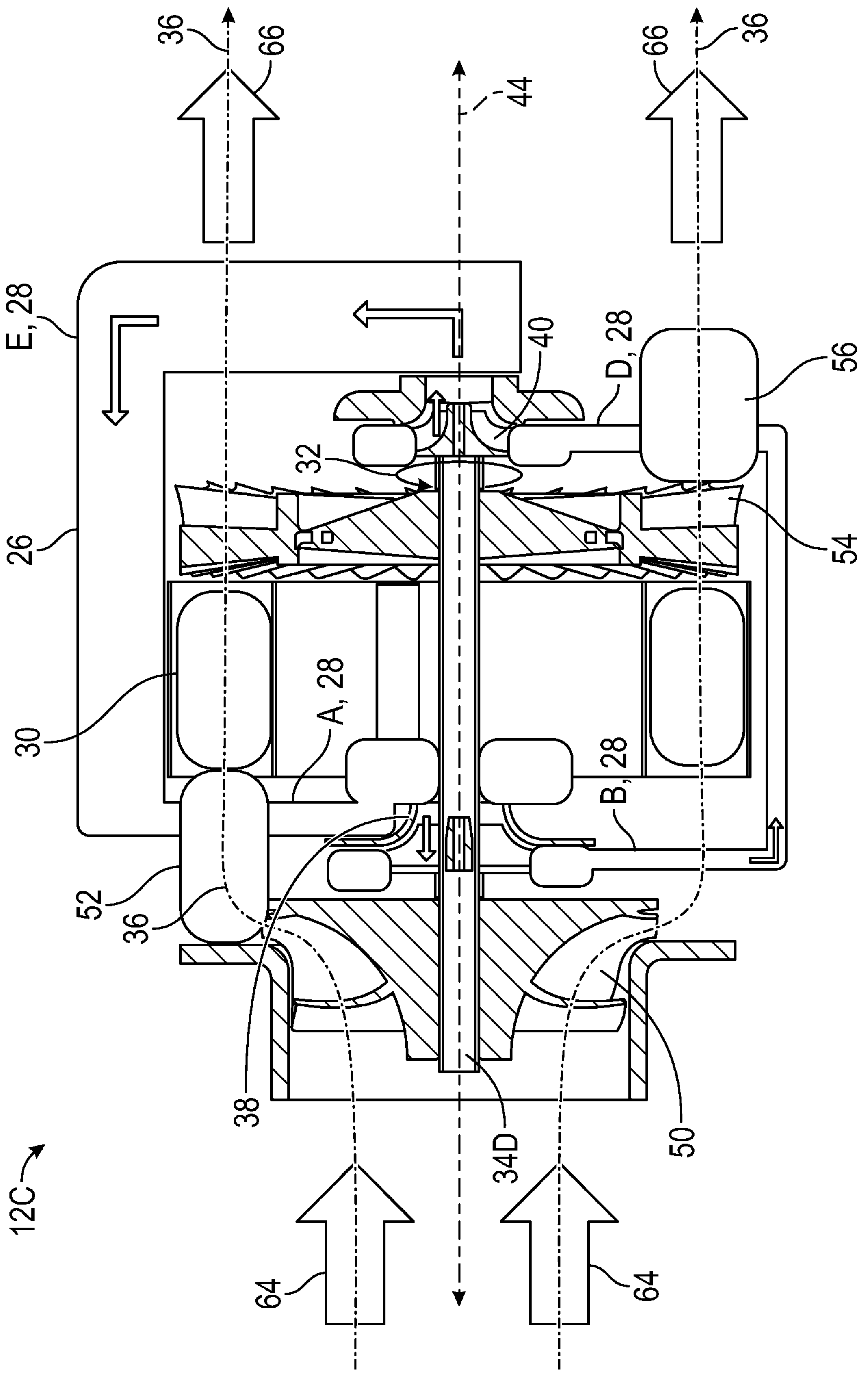
FIG. 5 is a schematic illustration, in partial cross-sectional view, of a third configuration of the first power plant and the second power plant of the power system.
Figure 7:
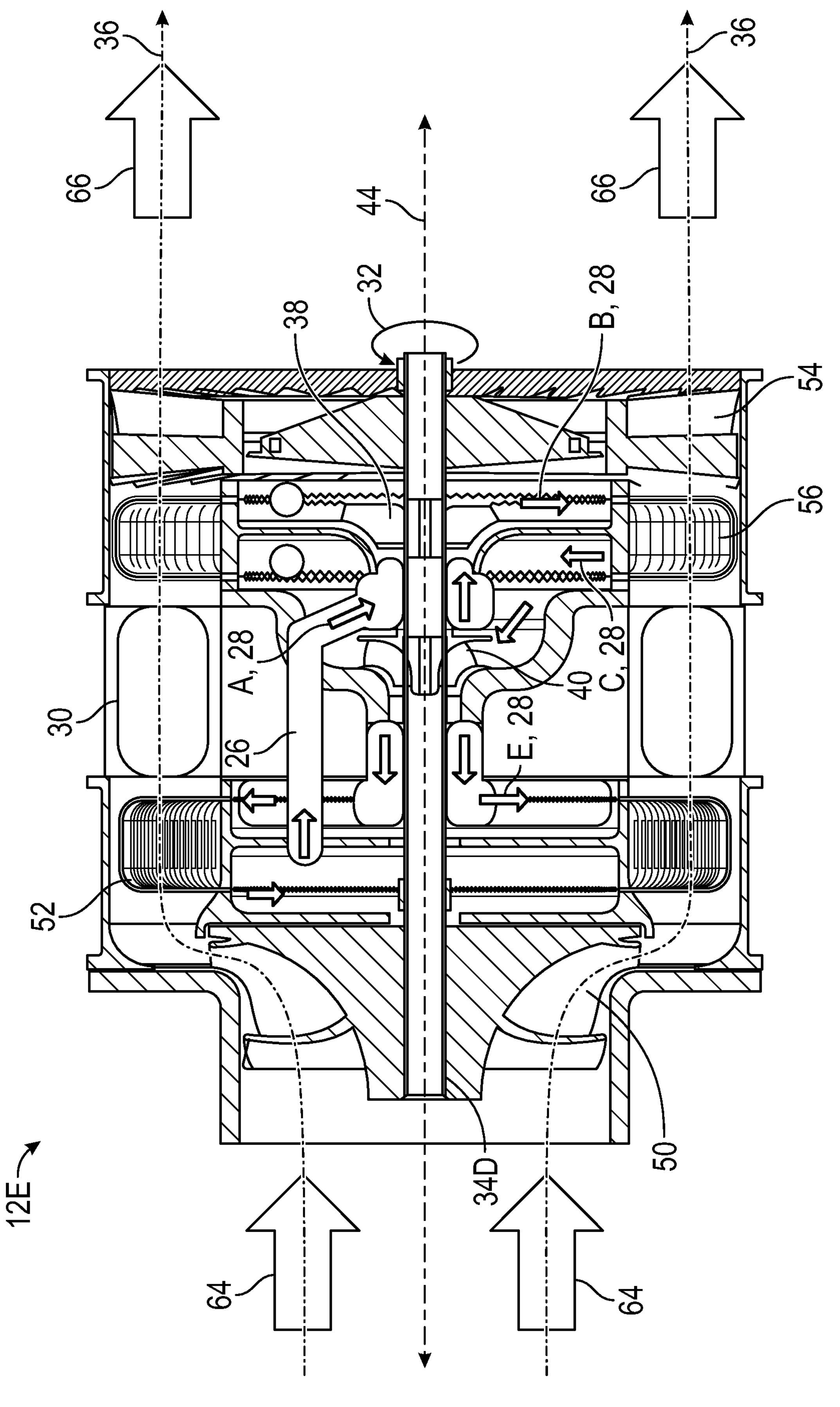
FIG. 7 is a schematic illustration, in partial cross-sectional view, of a fifth configuration of the first power plant and the second power plant of the power system.

Turning to FIGS. 5 and 7, two additional configurations of the power system 12C, 12E are illustrated. In these configurations, the optional recuperator 58 of FIGS. 4 and 6 is eliminated, and also the gearbox 42 of FIG. 3 is eliminated. Additionally, the generator 46 may be eliminated, but it is to be appreciated that the work output 32 produced via the second power plant 24 may be used to power another generator, a load compressor, other mechanical components, etc. In these configurations, the compressor 38 may be further defined as the first compressor 38, and the thermal engine 40 may be further defined as the first thermal engine 40. In these configurations, the first compressor 38 and the first thermal engine 40 are connected together to define a first turbine. Also, in these configurations, the second power plant 24 may include the second compressor 50 and the second thermal engine 54 connected together to define a second turbine. Therefore, in these configurations, the first turbine and the second turbine are mounted to a shaft 34D or more than one shaft 34D such that the first turbine and the second turbine are coaxial to each other. In addition, in these configurations, the first compressor 38 and the second compressor 50 are coaxial along the shaft 34D. Generally, the first mechanical path 44 and the exhaust-fluid path 36 are disposed offset from to each other.

Referring to FIGS. 5 and 7, these configurations may also include the precooler-heat-exchanger 52 and the heat intake 56. The precooler-heat-exchanger 52 may be referred to as a condenser, and the heat intake 56 may be referred to as an evaporator. The combustor 30 of the FIGS. 5 and 7 may be referred to as a burner.

The working fluid 28 path is a closed loop, and thus referred to as the closed fluid loop 26. Therefore, as shown in FIG. 5, the precooler-heat-exchanger 52, the first compressor 38, the heat intake 56, and the first thermal engine 40 are arranged along the closed fluid loop 26. As shown in FIG. 5, the first compressor 38 is disposed upstream of the first thermal engine 40 relative to the direction of flow of the exhaust-fluid path 36. That is, the first compressor 38 is disposed upstream from the first thermal engine 40. The flow (as identified as A, B, D and E) of the working fluid 28 through the closed fluid loop 26, in sequence starting at the precooler-heat-exchanger 52, is: to the first compressor 38, then to the heat intake 56, then to the first thermal engine 40, then back to the precooler-heat-exchanger 52 where the closed loop starts again.

Now turning to the exhaust-fluid path 36 of FIG. 5, the components, in sequence, starting at the inlet 64 are: the second compressor 50, then the precooler-heat-exchanger 52, then the combustor 30, then the second thermal engine 54, and finally through the outlet 66 to expel the exhaust gases outside of the second power plant 24, which may be to the outside of the flight vehicle 10.

Referring to FIG. 7, in this configuration of the power system 12E, some of the components are rearranged as compared to the arrangement of the power system 12C of FIG. 5. In the configuration of FIG. 7, the first compressor 38 is disposed downstream of the first thermal engine 40. In other words, the first thermal engine 40 is disposed upstream of the first compressor 38 relative to the direction of flow of the exhaust-fluid path 36. Furthermore, the second thermal engine 54 is disposed downstream of the heat intake 56, which reduces the temperature of the exhaust gases that then passes through the second thermal engine 54, which may assist in extending the life of the second thermal engine 54.

The working fluid 28 path is a closed loop, and thus referred to as the closed fluid loop 26. Therefore, in the configuration of FIG. 7, the precooler-heat-exchanger 52, the first compressor 38, the heat intake 56, and the first thermal engine 40 are arranged along the closed fluid loop 26. The flow (as identified as A, B, C, and E) of the working fluid 28 through the closed fluid loop 26, in sequence starting at the precooler-heat-exchanger 52, is: to the first compressor 38, then to the heat intake 56, then to the first thermal engine 40, then back to the precooler-heat-exchanger 52 where the closed loop starts again.

Now turning to the exhaust-fluid path 36 of FIG. 7, the components, in sequence, starting at the inlet 64 are: the second compressor 50, then the precooler-heat-exchanger 52, then the combustor 30, then the second thermal engine 54, and finally through the outlet 66 to expel the exhaust gases outside of the second power plant 24, which may be to the outside of the flight vehicle 10.

Figure 9:
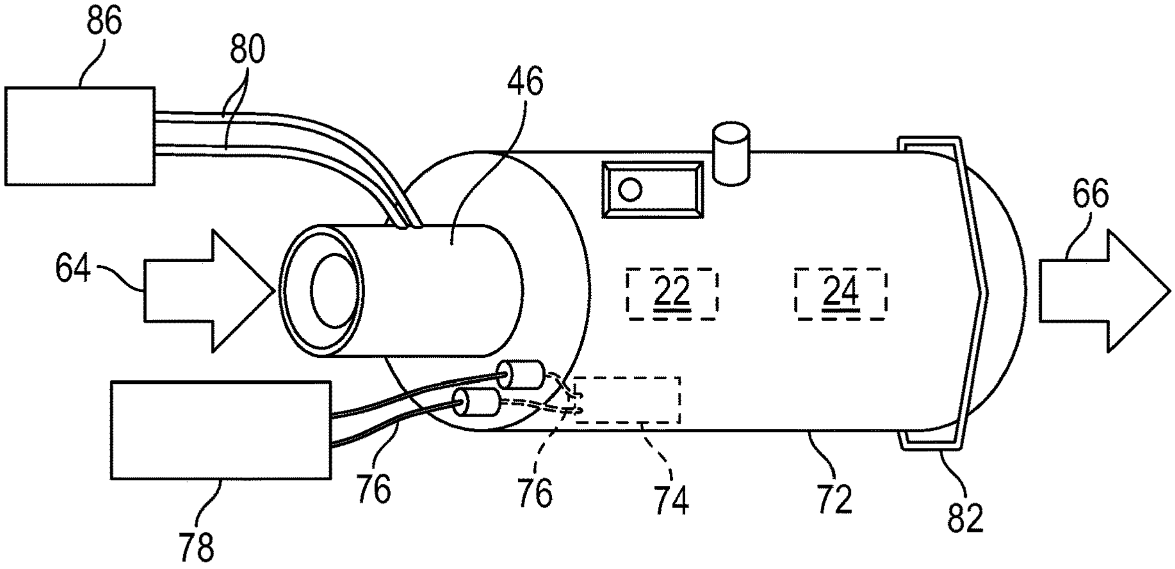
FIG. 9 is a schematic illustration of a container that houses the first power plant and the second power plant of any of the first-fifth configurations.
Figure 10:
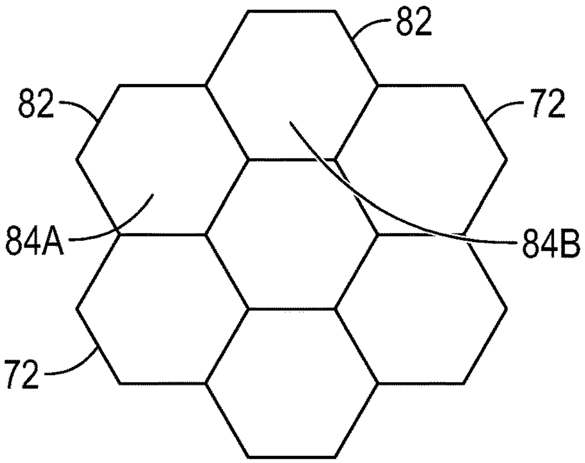
FIG. 10 is a schematic illustration of a plurality of the containers of FIG. 9 stacked relative to each other.

Optionally, as shown in FIGS. 9 and 10, the power system 12A-12E may include a container 72 that houses the first power plant 22. In certain configurations, the container 72 hermetically seals the first power plant 22. That is, the container 72 encasing the closed fluid loop 26, the compressor 38, and the thermal engine 40. Therefore, the container 72 houses the closed fluid loop 26, the compressor 38, and the thermal engine 40 such that the container 72 hermetically seals the power system 12A-12E therein, which may improve acoustic attenuation and lower a thermal signature outside of the container 72.

Optionally, the container 72 may include a container heat exchanger 74 configured to circulate a secondary container fluid, via a secondary loop 76, outside of the container 72 to warm an external component 78 disposed outside of the first power plant 22. Therefore, part of the secondary loop 76 is disposed within the container 72 and another part of the secondary loop 76 is disposed outside of the container 72 which leads to the external component 78 to be warmed. It is to be appreciated that the secondary container fluid may be any suitable fluid, and non-limiting examples may include propylene-glycol water, water-glycol mixture, oil including dielectric oil, engine oil, polymer based oil, petroleum based oil, etc., refrigerants, or any other suitable fluids.

In certain configurations of FIGS. 9 and 10, the container 72 may encase the first power plant 22 and the second power plant 24. For example, the turbine engine of the second power plant 24 and the heat pump of the first power plant 22 may be encased in the container 72. More specifically, any of the configurations of FIGS. 3-7 may be encased in the container 72. The container heat exchanger 74, which transfers heat to the secondary container fluid via the working fluid 28, is also encased in the container 72. The container heat exchanger 74 may transfer heat to the secondary container fluid via the closed fluid loop 26 of the first power plant 22. Therefore, the secondary container fluid may be heated via heat transfer from the working fluid 28 of the first power plant 22. Since the power system 12A-12E is continuously on for all operational modes of the flight vehicle 10, the secondary container fluid may be circulated, via the secondary loop 76, to one or more batteries to warm the batteries to assist in maintaining the desired temperature of the batteries, and therefore, assists in lowering the power requirements for starting-up main engines, i.e., primary propulsors 20, or other components that require a draw of power.

As shown in FIG. 9, electrical connectors or wires 80 may extend from the container 72, via the generator 46, to provide power to another system, etc., of the flight vehicle 10, for example, a power bus 86, the primary propulsor 20, one or more energy storage devices including batteries, etc., and/or electrical components.

Furthermore, the power system 12A-12E may be designed to accommodate different power demands. That is, one or more of the containers 72 may be used depending on the desired power output. Therefore, if the desired power output requires a plurality of the containers 72, these containers 72 may be electrically connected to each other in a series connection, to provide the desired power output. In this case, the containers 72 are also configured to be stackable which provides a space savings. Therefore, the containers 72 may each include a frame 82 disposed outside of the respective containers 72. The frame 82 may be a structure mounted to the outside of the containers 72 or the frame 82 may be formed as the outer surface of the container 72.

Referring to FIG. 10, for example, in certain configurations, the container 72 may be further defined as a first container 72 having a first frame 82 configuration, and further including a second container 72 having a second frame 82 configuration having the same configuration as the first frame 82 configuration, such that the second container 72 may be stacked with the first container 72. That is, the first container 72 and the second container 72 may have the same configuration such that the first container 72 and the second container 72 are stackable adjacent with each other.

Therefore, the first power plant 22 and the second power plant 24 may be further defined as a first unit 84A, and further including a second unit 84B configured the same as the first unit 84A, which may be stacked on the first unit 84A, and so on depending on the desired number of units 84A, 84B, which may be determined by the desired power output. The second unit 84B may be configured the same as the first unit 84A, and the second unit 84B may be electrically connected to the first unit 84A to increase a total power output. Therefore, the desired number of units 84A, 84B may be electrically connected in a series connection to obtain the desired total power output. Any of the configurations of FIGS. 3-7 may form one or more of the first units 84A and one or more of the second units 84B, which may be the same as each other or one or more may be different from each other. For example, the configuration of the first power plant 22 and the second power plant 24 of the first unit 84A may be one of the configurations of FIGS. 3-7 and the configuration of the first power plant 22 and the second power plant 24 of the second unit 84B may be a different configuration from the selected configuration of the first unit 84A, and so on depending on the desired number of the units 84A, 84B.

While the best modes and other configurations for carrying out the disclosure have been described in detail, those familiar with the art to which this disclosure relates will recognize various alternative designs and configurations for practicing the disclosure within the scope of the appended claims. Furthermore, the configurations shown in the drawings or the characteristics of various configurations mentioned in the present description are not necessarily to be understood as configurations independent of each other. Rather, it is possible that each of the characteristics described in one of the examples of a configuration can be combined with one or a plurality of other desired characteristics from other configurations, resulting in other configurations not described in words or by reference to the drawings. Accordingly, such other configurations fall within the framework of the scope of the appended claims.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware that enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The illustrations of the configurations described herein are intended to provide a general understanding of the structure of the various configurations. The illustrations are not intended to serve as a complete description of all of the elements and features of apparatus and systems that utilize the structures or methods described herein. Many other configurations may be apparent to those of skill in the art upon reviewing the disclosure. Other configurations may be utilized and derived from the disclosure, such that structural and logical substitutions and changes may be made without departing from the scope of the disclosure. Accordingly, the disclosure and the figures are to be regarded as illustrative rather than restrictive.

The following Clauses provide some example configurations of the power system 12A-12E, the flight vehicle 10, and the first power plant 22 as disclosed herein.

Clause 1: A power system for a flight vehicle, the power system comprising: a first power plant; a second power plant configured to combust a fuel-fluid mixture; and wherein the first power plant includes: a closed fluid loop configured to contain a working fluid; a compressor configured to compress the working fluid; and a thermal engine coupled to the compressor and configured to operate the compressor.

Clause 2: The power system as set forth in clause 1 wherein: the second power plant utilizes exhaust gases from combusting the fuel-fluid mixture to create power; the exhaust gases flow through the second power plant along an exhaust-fluid path; and the exhaust gases of the exhaust-fluid path is heated due to combusting of the fuel-fluid mixture, and heat from the exhaust gases is thermally transferred to the working fluid of the closed fluid loop in which the first power plant utilizes to create power.

Clause 3: The power system as set forth in one of clauses 1 or 2 wherein the working fluid is in a supercritical state.

Clause 4: The power system as set forth in any one of the preceding clauses wherein: the compressor is further defined as a first compressor; the first power plant includes a gearbox connected to the first compressor and the thermal engine along a first mechanical path; the first power plant includes a generator connected to the gearbox along a second mechanical path such that work output from the gearbox is used via the generator; and the first mechanical path and the second mechanical path are offset from each other.

Clause 5: The power system as set forth in any one of the preceding clauses wherein: the thermal engine is further defined as a first thermal engine; and the second power plant includes a second compressor connected to the gearbox along an exhaust-fluid path; the first power plant includes a precooler-heat-exchanger disposed downstream from the second compressor along the exhaust-fluid path; the second power plant includes a second thermal engine disposed downstream from the precooler-heat-exchanger along the exhaust-fluid path; and the first power plant includes a heat intake disposed downstream from the second thermal engine along the exhaust-fluid path.

Clause 6: The power system as set forth in any one of the preceding clauses wherein the precooler-heat-exchanger, the first compressor, the heat intake, and the first thermal engine are arranged along the closed fluid loop.

Clause 7: The power system as set forth in one of clauses 1-3 wherein: the compressor is further defined as a first compressor; the thermal engine is further defined as a first thermal engine; the first compressor is connected to the first thermal engine along a first mechanical path; the first power plant includes a generator connected to the first thermal engine along the first mechanical path such that work output from the first thermal engine is used via the generator; and the first thermal engine and the generator are coaxial to each other.

Clause 8: The power system as set forth in one of clauses 1-3 or 7 wherein: the second power plant includes a second compressor and a second thermal engine coupled to each other along an exhaust-fluid path; the first power plant includes a precooler-heat-exchanger disposed downstream from the first compressor and the second compressor along the exhaust-fluid path; the first thermal engine and the second thermal engine are disposed downstream from the precooler-heat-exchanger along the exhaust-fluid path; and the first power plant includes a heat intake disposed downstream from the first thermal engine and the second thermal engine along the exhaust-fluid path.

Clause 9: The power system as set forth in one of clauses 1-3, 7, or 8 wherein the precooler-heat-exchanger, the first compressor, the heat intake, and the first thermal engine are arranged along the closed fluid loop.

Clause 10: The power system as set forth in one of clauses 1-3 or 7 wherein: the second power plant includes a second compressor and a second thermal engine coupled to each other along an exhaust-fluid path; the first power plant includes a precooler-heat-exchanger disposed downstream from the first thermal engine along the exhaust-fluid path; the second compressor disposed upstream from the precooler-heat-exchanger and the first thermal engine along the exhaust-fluid path; and the first power plant includes a heat intake disposed upstream from the first compressor and the second thermal engine along the exhaust-fluid path.

Clause 11: The power system as set forth in one of clauses 1-3, 7, or 10 wherein the precooler-heat-exchanger, the first compressor, the heat intake, and the first thermal engine are arranged along the closed fluid loop.

Clause 12: The power system as set forth in one of clauses 1-3 wherein: the compressor is further defined as a first compressor; the thermal engine is further defined as a first thermal engine; the first compressor and the first thermal engine are connected together to define a first turbine; the second power plant includes a second compressor and a second thermal engine connected together to define a second turbine; and the first turbine and the second turbine are mounted to a shaft such that the first turbine and the second turbine are coaxial to each other.

Clause 13: The power system as set forth in one of clauses 1-3 or 12 wherein: the first power plant includes a precooler-heat-exchanger and a heat intake; and the precooler-heat-exchanger, the first compressor, the heat intake, and the first thermal engine are arranged along the closed fluid loop.

Clause 14: The power system as set forth in any one of the preceding clauses further including a container that houses the first power plant, wherein the container hermetically seals the first power plant.

Clause 15: The power system as set forth in any one of the preceding clauses wherein the container includes a container heat exchanger configured to circulate a secondary container fluid outside of the container to warm an external component disposed outside of the first power plant.

Clause 16: The power system as set forth in any one of the preceding clauses: wherein the first power plant and the second power plant are further defined as a first unit; further including a second unit configured the same as the first unit, with the second unit electrically connected to the first unit to increase a total power output; wherein the container is further defined as a first container having a first frame configuration; and further including a second container having a second frame configuration being the same configuration as the first frame configuration such that the first container and the second container are stackable adjacent with each other.

Clause 17: A flight vehicle comprising: a primary propulsor; a power system coupled to the primary propulsor and configured to provide power to the primary propulsor, wherein the power system is separate from the primary propulsor such that the power system is continuously operable independently of the primary propulsor to provide power to operate the flight vehicle; and wherein the power system includes a first power plant comprising: a closed fluid loop configured to contain a working fluid; a compressor configured to compress the working fluid; and a thermal engine coupled to the compressor and configured to operate the compressor.

Clause 18: The flight vehicle as set forth in clause 17 further including a container that houses the closed fluid loop, the compressor, and the thermal engine such that the container hermetically seals the power system therein.

Clause 19: A first power plant for a power system of a flight vehicle, wherein the flight vehicle includes a primary propulsor, the first power plant comprising: a closed fluid loop configured to contain a working fluid; a compressor configured to compress the working fluid; a thermal engine coupled to the compressor and configured to operate the compressor; and a container encasing the closed fluid loop, the compressor, and the thermal engine, wherein the first power plant is continuously operable independently of the primary propulsor to provide power to operate the flight vehicle.

Clause 20: The flight vehicle as set forth in clause 19 wherein the container hermetically seals the first power plant therein.

What is claimed is:

1. A power system for a flight vehicle, the power system comprising:

a first power plant comprising:

a closed fluid loop configured to contain a working fluid;

a compressor configured to compress the working fluid; and a thermal engine coupled to the compressor and configured to operate the compressor;

a second power plant configured to combust a fuel-fluid mixture, wherein the combustion of the fuel-fluid mixture generates exhaust gases, wherein the closed fluid loop is configured to transfer heat from the exhaust gases to the working fluid of the closed fluid loop, and wherein the first power plant is configured to generate power from the heated working fluid.

2. The power system as set forth in claim 1 wherein:

the second power plant utilizes the exhaust gases from combusting the fuel-fluid mixture to create power;

the exhaust gases flow through the second power plant along an exhaust-fluid path; and the exhaust gases of the exhaust-fluid path is heated due to combusting of the fuel-fluid mixture.

3. The power system as set forth in claim 2 wherein the working fluid is in a supercritical state.

4. The power system as set forth in claim 1 wherein:

the compressor is further defined as a first compressor;

the first power plant includes a gearbox connected to the first compressor and the thermal engine along a first mechanical path;

the first power plant includes a generator connected to the gearbox along a second mechanical path such that work output from the gearbox is used via the generator; and the first mechanical path and the second mechanical path are offset from each other.

5. The power system as set forth in claim 4 wherein:

the thermal engine is further defined as a first thermal engine; and the second power plant includes a second compressor connected to the gearbox along an exhaust-fluid path;

the first power plant includes a precooler-heat-exchanger disposed downstream from the second compressor along the exhaust-fluid path;

the second power plant includes a second thermal engine disposed downstream from the precooler-heat-exchanger along the exhaust-fluid path; and the first power plant includes a heat intake disposed downstream from the second thermal engine along the exhaust-fluid path.

6. The power system as set forth in claim 5 wherein the precooler-heat-exchanger, the first compressor, the heat intake, and the first thermal engine are arranged along the closed fluid loop.

7. The power system as set forth in claim 1 wherein:

the compressor is further defined as a first compressor;

the thermal engine is further defined as a first thermal engine;

the first compressor is connected to the first thermal engine along a first mechanical path;

the first power plant includes a generator connected to the first thermal engine along the first mechanical path such that work output from the first thermal engine is used via the generator; and the first thermal engine and the generator are coaxial to each other.

8. The power system as set forth in claim 7 wherein:

the second power plant includes a second compressor and a second thermal engine coupled to each other along an exhaust-fluid path;

the first power plant includes a precooler-heat-exchanger disposed downstream from the first compressor and the second compressor along the exhaust-fluid path;

the first thermal engine and the second thermal engine are disposed downstream from the precooler-heat-exchanger along the exhaust-fluid path; and the first power plant includes a heat intake disposed downstream from the first thermal engine and the second thermal engine along the exhaust-fluid path.

9. The power system as set forth in claim 8 wherein the precooler-heat-exchanger, the first compressor, the heat intake, and the first thermal engine are arranged along the closed fluid loop.

10. The power system as set forth in claim 7 wherein:

the second power plant includes a second compressor and a second thermal engine coupled to each other along an exhaust-fluid path;

the first power plant includes a precooler-heat-exchanger disposed downstream from the first thermal engine along the exhaust-fluid path;

the second compressor disposed upstream from the precooler-heat-exchanger and the first thermal engine along the exhaust-fluid path; and the first power plant includes a heat intake disposed upstream from the first compressor and the second thermal engine along the exhaust-fluid path.

11. The power system as set forth in claim 10 wherein the precooler-heat-exchanger, the first compressor, the heat intake, and the first thermal engine are arranged along the closed fluid loop.

12. The power system as set forth in claim 1 wherein:

the compressor is further defined as a first compressor;

the thermal engine is further defined as a first thermal engine;

the first compressor and the first thermal engine are connected together to define a first turbine;

the second power plant includes a second compressor and a second thermal engine connected together to define a second turbine; and the first turbine and the second turbine are mounted to a shaft such that the first turbine and the second turbine are coaxial to each other.

13. The power system as set forth in claim 12 wherein:

the first power plant includes a precooler-heat-exchanger and a heat intake; and the precooler-heat-exchanger, the first compressor, the heat intake, and the first thermal engine are arranged along the closed fluid loop.

14. The power system as set forth in claim 1 further including a container that houses the first power plant, wherein the container hermetically seals the first power plant.

15. The power system as set forth in claim 14 wherein the container includes a container heat exchanger configured to circulate a secondary container fluid outside of the container to warm an external component disposed outside of the first power plant.

16. The power system as set forth in claim 14:

wherein the first power plant and the second power plant are further defined as a first unit;

further including a second unit configured the same as the first unit, with the second unit electrically connected to the first unit to increase a total power output;

wherein the container is further defined as a first container having a first frame configuration; and further including a second container having a second frame configuration being the same configuration as the first frame configuration such that the first container and the second container are stackable adjacent with each other.

17. A flight vehicle comprising:

a primary propulsor;

a power system coupled to the primary propulsor and configured to provide power to the primary propulsor, wherein the power system is separate from the primary propulsor such that the power system is continuously operable independently of the primary propulsor to provide power to operate the flight vehicle; and wherein the power system includes a first power plant comprising:

a closed fluid loop configured to contain a working fluid;

a first compressor configured to compress the working fluid; and a thermal engine coupled to the first compressor and configured to operate the first compressor;

wherein the first power plant includes a gearbox connected to the first compressor and the thermal engine along a first mechanical path;

wherein the first power plant includes a generator connected to the gearbox along a second mechanical path such that work output from the gearbox is used via the generator; and wherein the first mechanical path and the second mechanical path are offset from each other.

18. The flight vehicle as set forth in claim 17 further including a container that houses the closed fluid loop, the first compressor, and the thermal engine such that the container hermetically seals the power system therein.

19. A first power plant for a power system of a flight vehicle, wherein the flight vehicle includes a primary propulsor, the first power plant comprising:

a closed fluid loop configured to contain a working fluid;

a first compressor configured to compress the working fluid;

a first thermal engine coupled to the first compressor and configured to operate the first compressor; and a container encasing the closed fluid loop, the first compressor, and the first thermal engine, wherein the first power plant is continuously operable independently of the primary propulsor to provide power to operate the flight vehicle;

a second power plant configured to combust a fuel-fluid mixture;

wherein the first compressor and the first thermal engine are connected together to define a first turbine;

wherein the second power plant includes a second compressor and a second thermal engine connected together to define a second turbine; and wherein the first turbine and the second turbine are mounted to a shaft such that the first turbine and the second turbine are coaxial to each other.

20. The flight vehicle as set forth in claim 19 wherein the container hermetically seals the first power plant therein.

* * * * *